US006646640B2

(12) United States Patent
Nagy

(10) Patent No.: US 6,646,640 B2
(45) Date of Patent: Nov. 11, 2003

(54) SYSTEM AND METHOD FOR CREATING REAL-TIME SHADOWS OF COMPLEX TRANSPARENT OBJECTS

(75) Inventor: Gabor Nagy, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 298 days.

(21) Appl. No.: 09/778,183

(22) Filed: Feb. 6, 2001

(65) Prior Publication Data

US 2002/0107070 A1 Aug. 8, 2002

(51) Int. Cl.[7] .............................................. G06T 15/60
(52) U.S. Cl. .................. 345/426; 345/427; 345/582; 345/421
(58) Field of Search ................. 345/426, 421, 345/581, 582, 611, 427, 428, 952, 592

(56) References Cited

U.S. PATENT DOCUMENTS 5,559,950 A * 9/1996 Cannon ...................... 345/501
5,870,098 A * 2/1999 Gardiner .................... 345/426
5,880,736 A * 3/1999 Peercy et al. ............... 345/426

* cited by examiner

Primary Examiner—Mark Zimmerman
Assistant Examiner—Kimbinh T. Nguyen
(74) Attorney, Agent, or Firm—Carr & Ferrell LLP

(57) ABSTRACT

A system and method for creating real-time shadows of complex transparent objects includes a processor and a main memory that stores a transparent blocker object and a receiver object. A light source in a three-dimensional game environment determines an origin of a light coordinate system. A unit vector from the light source to the blocker object defines a z-axis of the light coordinate system and defines a light vector. The processor converts vertices of the blocker object from world coordinates into light coordinates. A graphics processor then calculates a shadow map by taking the dot-product of the light vector and each vertex of the blocker object. The shadow map is then stored in a memory of a graphics processor and is applied as a texture map to the receiver object by the graphics processor.

30 Claims, 7 Drawing Sheets

SYSTEM AND METHOD FOR CREATING REAL-TIME SHADOWS OF COMPLEX TRANSPARENT OBJECTS

BACKGROUND OF THE INVENTION

1. Field of the Invention

This invention relates generally to electronic gaming systems and more particularly to creating real-time shadows of complex transparent objects.

2. Description of the Background Art

Electronic gaming systems are able to produce high-quality images on display devices, typically television sets. Three-dimensional images are ever more realistic due to the increasing speed of processors. However, the capabilities of the gaming system's processor and other hardware continue to limit the development of software to create realistic three-dimensional images in real-time.

Electronic gaming systems must be able to perform calculations fast enough to generate new images at approximately 30 or 60 frames per second. When each image contains multiple complex objects, the number of calculations can tax the capabilities of a system's processor. Thus, it is a goal of electronic game developers to produce methods of generating images in real-time that provide high-quality images within the limits of current hardware systems.

One of the challenges facing game developers is rendering realistic shadows of transparent objects, such as glass objects, particularly those with complex shapes. Shadows of transparent objects are more complex than those of opaque objects. Shadows of opaque objects are typically uniformly dark throughout and shadows of transparent objects are typically non-uniform in shading and color. Techniques such as ray-tracing may be used to generate shadows of transparent objects; however, these techniques are computationally expensive, do not produce realistic results, and thus are not suitable for polygon-based three-dimensional graphics hardware used in electronic gaming systems.

SUMMARY OF THE INVENTION

An electronic entertainment system includes a main memory configured to store a transparent object and a receiver object, a general-purpose processor configured to execute game instructions, and a graphics processor configured to execute drawing instructions. The graphics processor, in conjunction with a vector processing unit, calculates a shadow map for the transparent object, and applies the shadow map to the receiver object.

The shadow map is calculated by determining a light vector and a light coordinate system, converting vertices of the transparent object into light coordinates, and taking a dot product of the light vector and each vertex of the transparent object in light coordinates. The shadow map is stored in a memory of the graphics processor, and then applied to the receiver object as a texture map. The graphics processor, in conjunction with the vector processing unit, preferably applies the shadow map to the receiver object using multiplicative pixel-blending techniques.

The general purpose processor determines a light vector by finding a mean direction vector from a light source to the transparent object. The mean direction vector is preferably an average of the vectors from the light source to each vertex of the transparent object. The mean direction vector may also be a vector from the light source to the center of a bounding volume of the transparent object. The light vector defines a z-axis of the light coordinate system with its origin at the light source. The general purpose processor converts the vertices of the transparent object into light coordinates using one or more conversion matrices.

DETAILED DESCRIPTION OF THE PREFERRED EMBODIMENT

Figure 1:
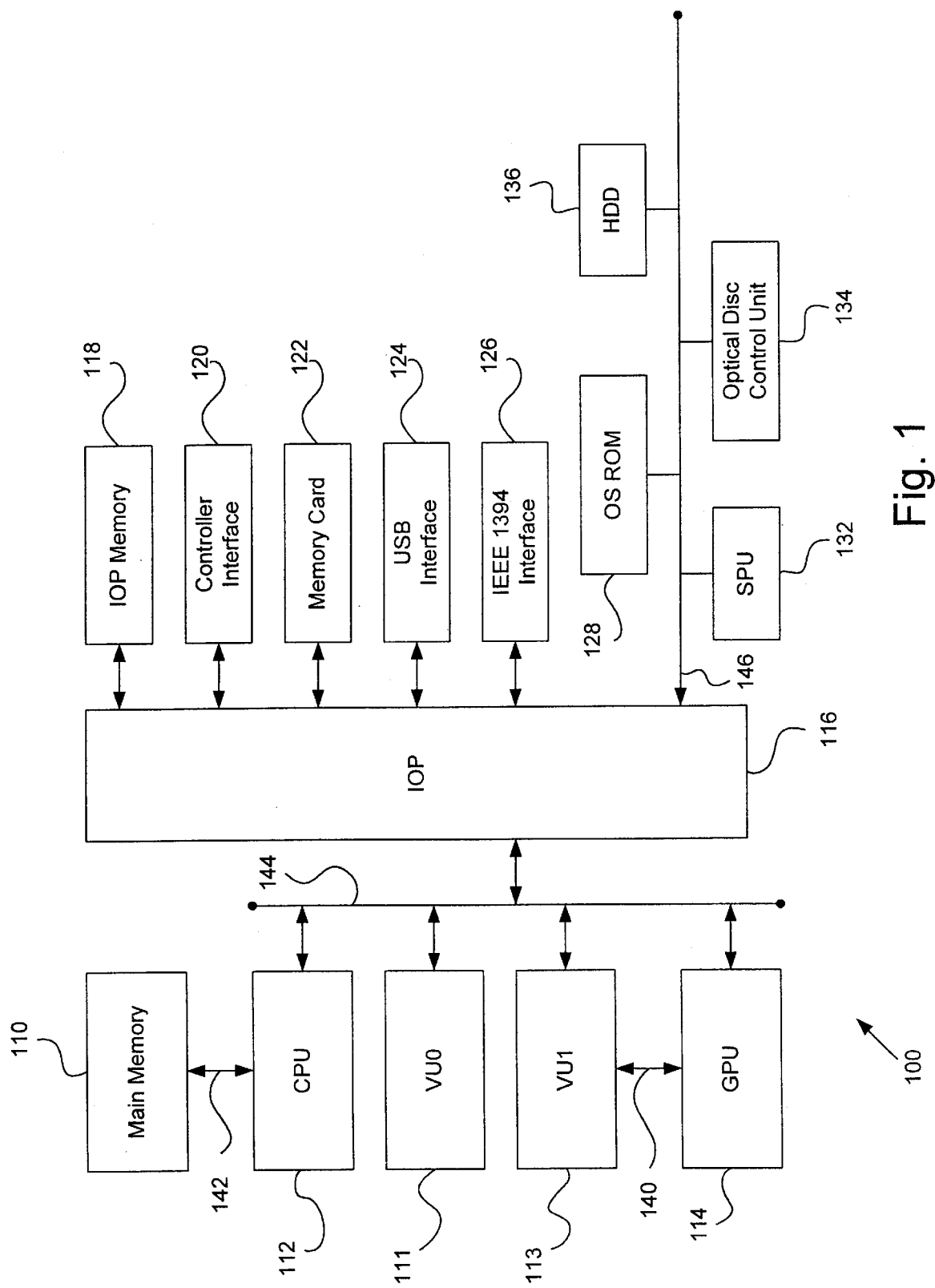
FIG. 1 is a block diagram of one embodiment of an electronic entertainment system according to the invention.

FIG. 1 is a block diagram of one embodiment of an electronic entertainment system 100 in accordance with the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a Universal Serial Bus (USB) interface 124, and an IEEE 1394 interface 126. System 100 also includes an operating system read-only memory (OS ROM) 128, a sound processing unit (SPU) 132, an optical disc control unit 134, and a hard disc drive (HDD) 136, which are connected via a bus 146 to IOP 116.

CPU 112, VU0 111, VU1 113, GPU 114, and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain prestored programs and may also contain programs transferred via IOP 116 from a CD-ROM or DVD-ROM (not shown) using optical disc control unit 134. IOP 116 controls data exchanges between CPU 112, VU0 111, VU1 113, GPU 114 and other devices of system 100, such as controller interface 120.

GPU 114 executes drawing instructions from CPU 112 and VU0 111 to produce images for display on a display device (not shown). VU1 113 transforms objects from three-dimensional coordinates to two-dimensional coordinates, and sends the two-dimensional coordinates to GPU 114. SPU 132 executes instructions to produce sound signals that are output on an audio device (not shown). A user of system 100 provides instructions via controller interface 120 to CPU 112. For example, the user may instruct CPU 112 to store certain game information on memory card 122. Other devices may be connected to system 100 via USB interface 124 and IEEE 1394 interface 126.

Figure 2A:
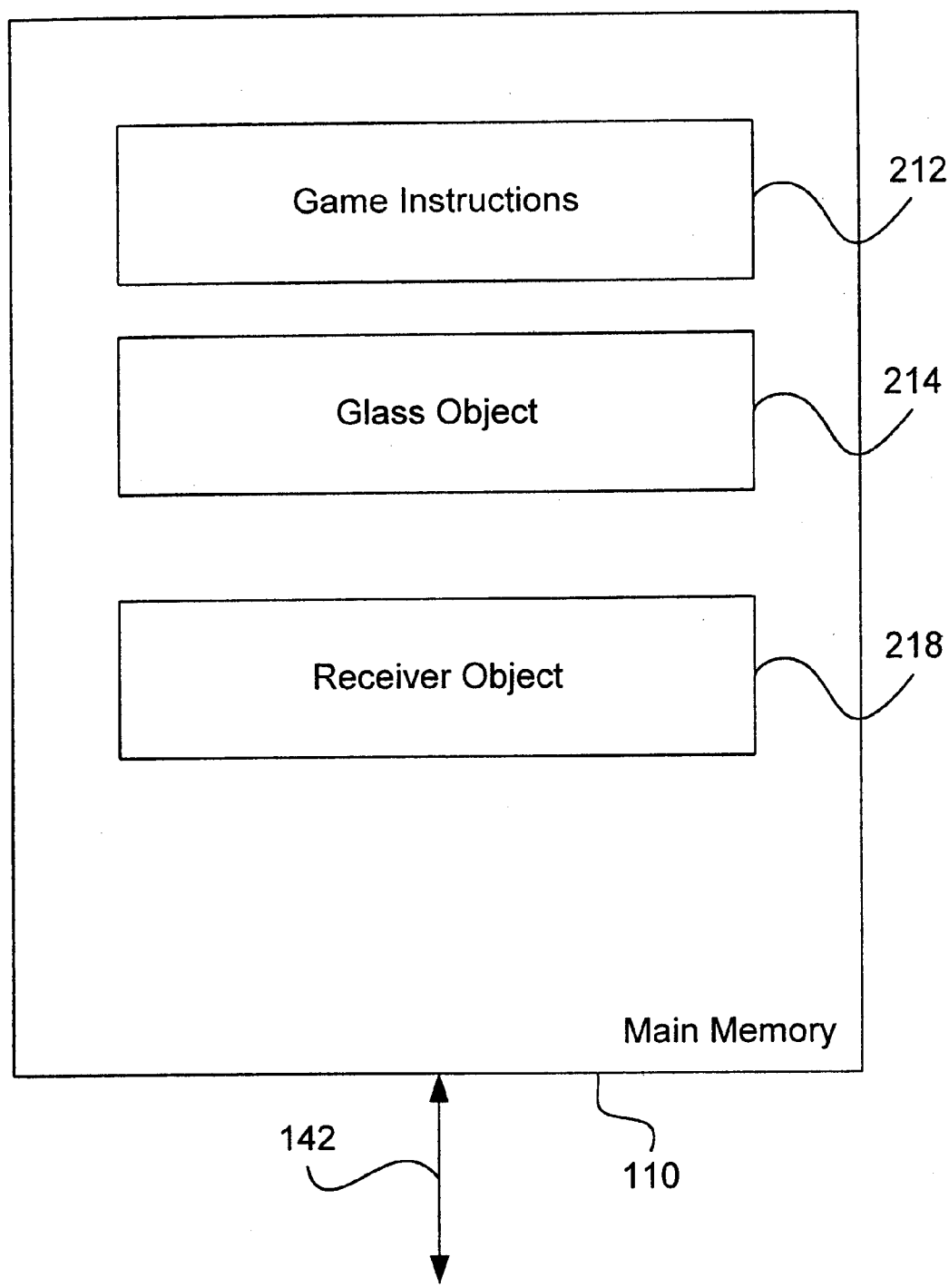
FIG. 2A is a block diagram of one embodiment of the main memory of FIG. 1, according to the invention.

FIG. 2A is a diagram of one embodiment of main memory 110 of FIG. 1, according to the invention. Main memory 110 includes, but is not limited to, game instructions 212, a transparent object 214, and a receiver object 218. Game instructions 212 are preferably loaded from a CD-ROM via optical disc control unit 134 into main memory 110. CPU 112, in conjunction with GPU 114 and SPU 132, executes game instructions 212 using inputs received via controller interface 120 from a user.

Transparent object 214 includes information that defines a transparent object in three-dimensional space. Transparent object 214 typically includes a number of vertices that define polygons, and color information for each vertex. The vertices of transparent object 214 are typically stored as three-dimensional points in a world coordinate system. Transparent object 214 may be any shape and any color, for example a wine glass, a plastic tube, or a stained-glass window. Although only one transparent object 214 is shown in FIG. 2A, main memory 110 may contain any number of transparent objects.

Receiver object 218 includes a number of vertices that define polygons, and color information for each vertex. The vertices of receiver object 218 are typically stored as three-dimensional points in a world coordinate system. Receiver object 218 is an object that may receive a shadow of transparent object 214. Receiver object 218 may be any type of object, including a game character or a background of an image. Although only one receiver object 218 is shown in FIG. 2A, main memory 110 may contain any number of receiver objects.

Figure 2B:
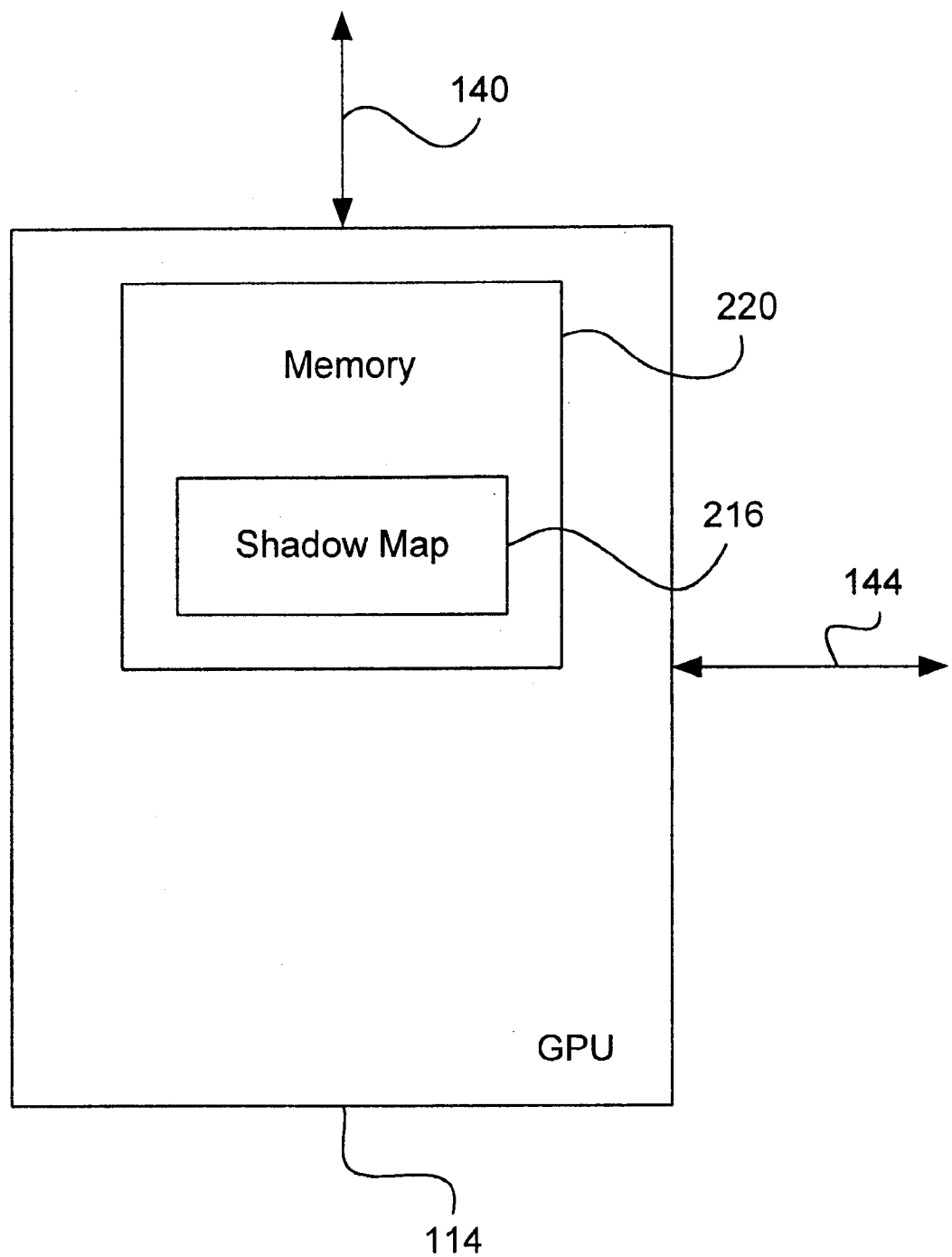
FIG. 2B is a block diagram of one embodiment of the graphics processing unit (GPU) of FIG. 1, according to the invention.

FIG. 2B is a diagram of one embodiment of GPU 114 of FIG. 1, according to the invention. GPU 114 includes a memory 220. Memory 220 is configured to store a shadow map 216. Shadow map 216 is drawn by GPU 114 and stored in memory 220 as a two-dimensional texture image. In the FIG. 2B embodiment, shadow map 216 is associated with transparent object 214. Shadow map 216 is further discussed below in conjunction with FIGS. 4–6. Main memory 110 may store numerous transparent and non-transparent objects, and memory 220 may store shadow maps for those objects.

Figure 3A:
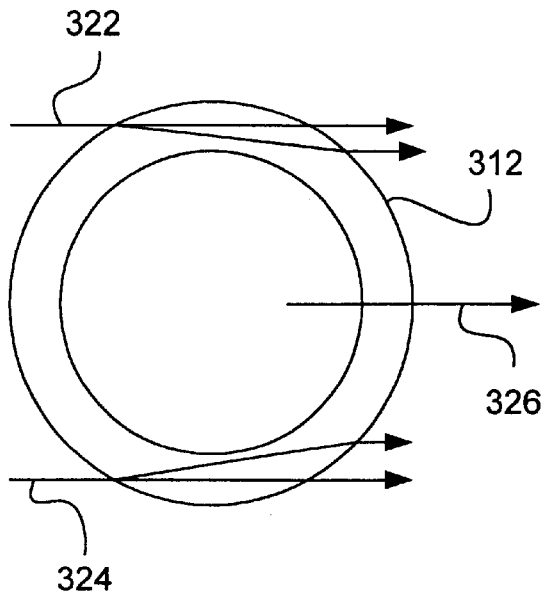
FIG. 3A is a diagram of a cross-section of a transparent cylinder.

FIG. 3A is a diagram of a cross-section of a transparent cylinder 312. A light source (not shown), positioned to the left of transparent cylinder 312 and slightly above the page, produces various light rays, including light rays 322, 324, 326, that pass through cylinder 312. As shown in FIG. 3A, light rays 322–324 passing through the edges of cylinder 312 must pass through more transparent material than a light ray 326 that passes through one side of cylinder 312. Light rays 322. 324. 326 are refracted as they pass through cylinder 312, and create a shadow on an object that receives refracted light rays 322, 324, 326.

Figure 3B:
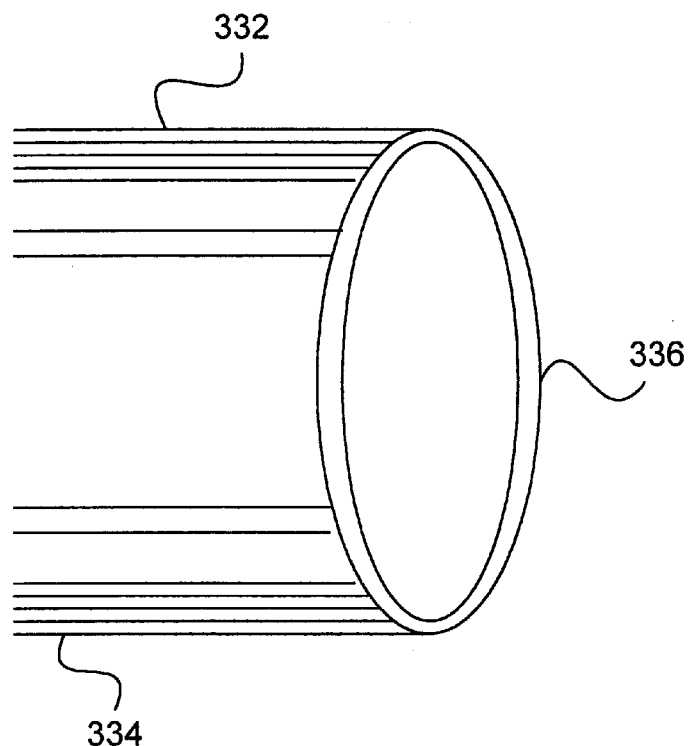
FIG. 3B is a diagram of a shadow of the transparent cylinder of FIG. 3A.

FIG. 3B is a diagram of a shadow of transparent cylinder 312. As shown in FIG. 3B, the shadow is darker at edges 332 and 334 because light rays such as rays 322 and 324 must pass through more transparent material and are more attenuated. This is one aspect of shadows of transparent objects that should be addressed when producing electronic images of such shadows.

Figure 4:
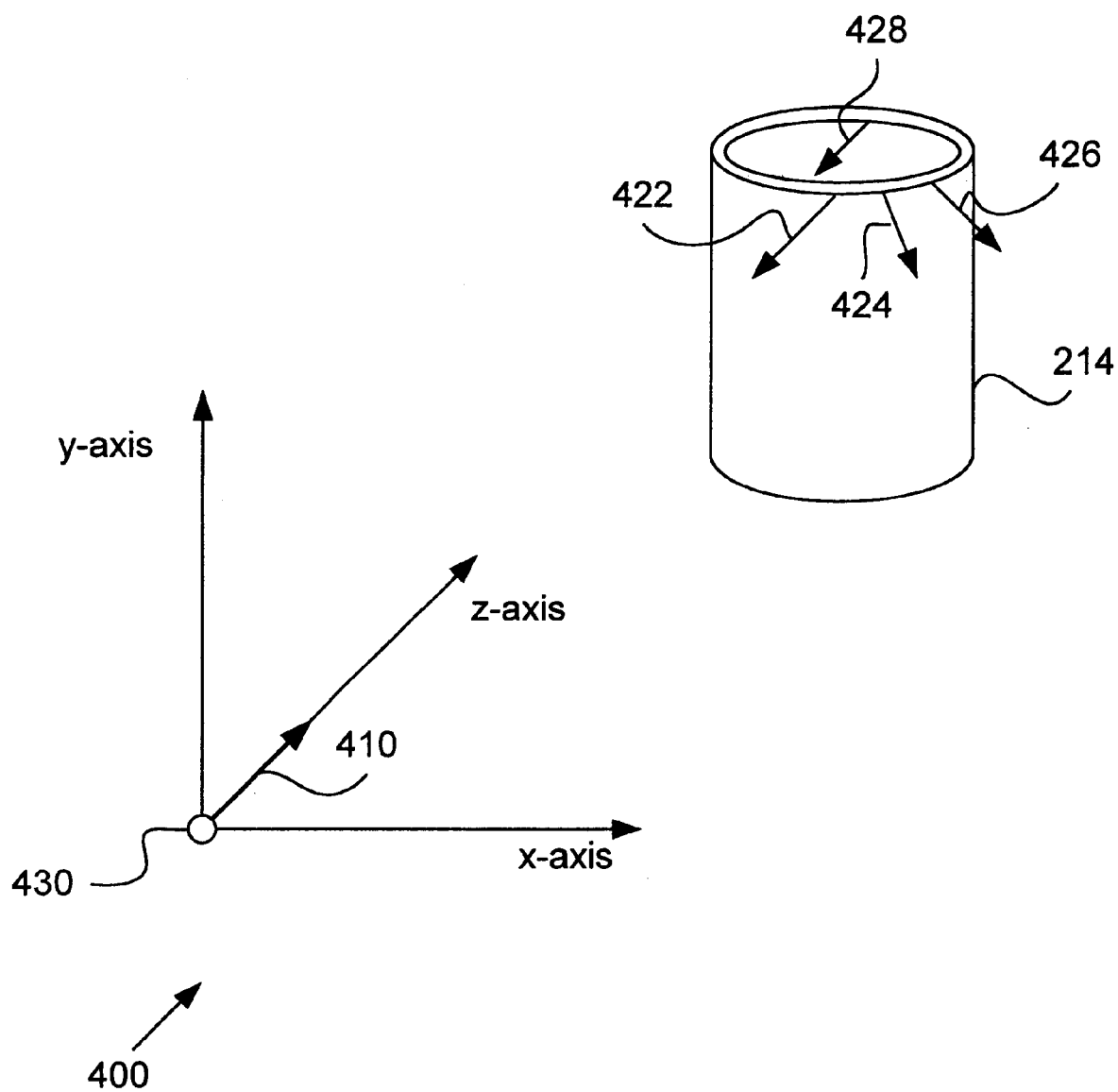
FIG. 4 is a diagram of a light coordinate system and a transparent blocker object, according to the invention.

FIG. 4 is a diagram of a light coordinate system 400 and a transparent blocker object 214, according to one embodiment of the invention. Transparent blocker object 214 is a hollow transparent cylinder. Although not shown in FIG. 4, transparent object 214 includes polygons that are defined by vertices stored in main memory 110. Each vertex includes position and color information and has a corresponding normal vector. Exemplary normal vectors 422, 424, 426, 428 are shown.

A light vector 410 is a unit vector in world coordinates that originates at a light source 430 and points toward transparent object 214. Light vector 410 defines a z-axis of light coordinate system 400, where the origin is light source 430. Light vector 410 may be determined by finding a mean direction vector, which may be an average of vectors pointing from light source 430 to each vertex of transparent object 214. The mean direction vector may also be a vector from the light source to the center of a bounding volume of transparent object 214. Unit vectors that define an x-axis and a y-axis of light coordinate system 400 are then determined according to techniques known in the art.

The vertices of transparent object 214 are then converted into light coordinates. The vertices of transparent object 214 are typically expressed as three-dimensional points in world coordinates in main memory 110. CPU 112 transforms the vertices of transparent object 214 from world coordinates into light coordinates using one or more conversion matrices.

A shadow map 216 for transparent object 214 is created by determining the dot product of light vector 410 and each of the normal vectors 422, 424, 426, 428 of transparent object 214. For vertices with normal vectors that are substantially parallel to light vector 410, such as normal vectors 422 and 428, the value of the dot product will be close to one. For vertices with normal vectors that are substantially perpendicular to light vector 410, such as light vector 426, the value of the dot product will be close to zero. Thus, shadow map 216 for transparent object 214 will be darker at the edges than at the middle, which approximates the effects of a real shadow of a transparent object.

Shadow map 216 is stored as a two-dimensional texture object in memory 220 of GPU 114. Thus shadow map 216 may be applied to receiver object 218 using techniques for applying a texture to an object. In the preferred embodiment, receiver object 218, with shadow map 216 applied, is drawn by VU1 113 and GPU 114 using multi-pass rendering with multiplicative pixel-blending. This technique allows other textures to be applied to receiver object 218. Shadow map 216 may be applied partially to receiver object 218 and partially to another object or an image background. Similarly, multiple shadow maps may be applied to a single object and may overlap.

Figure 5:
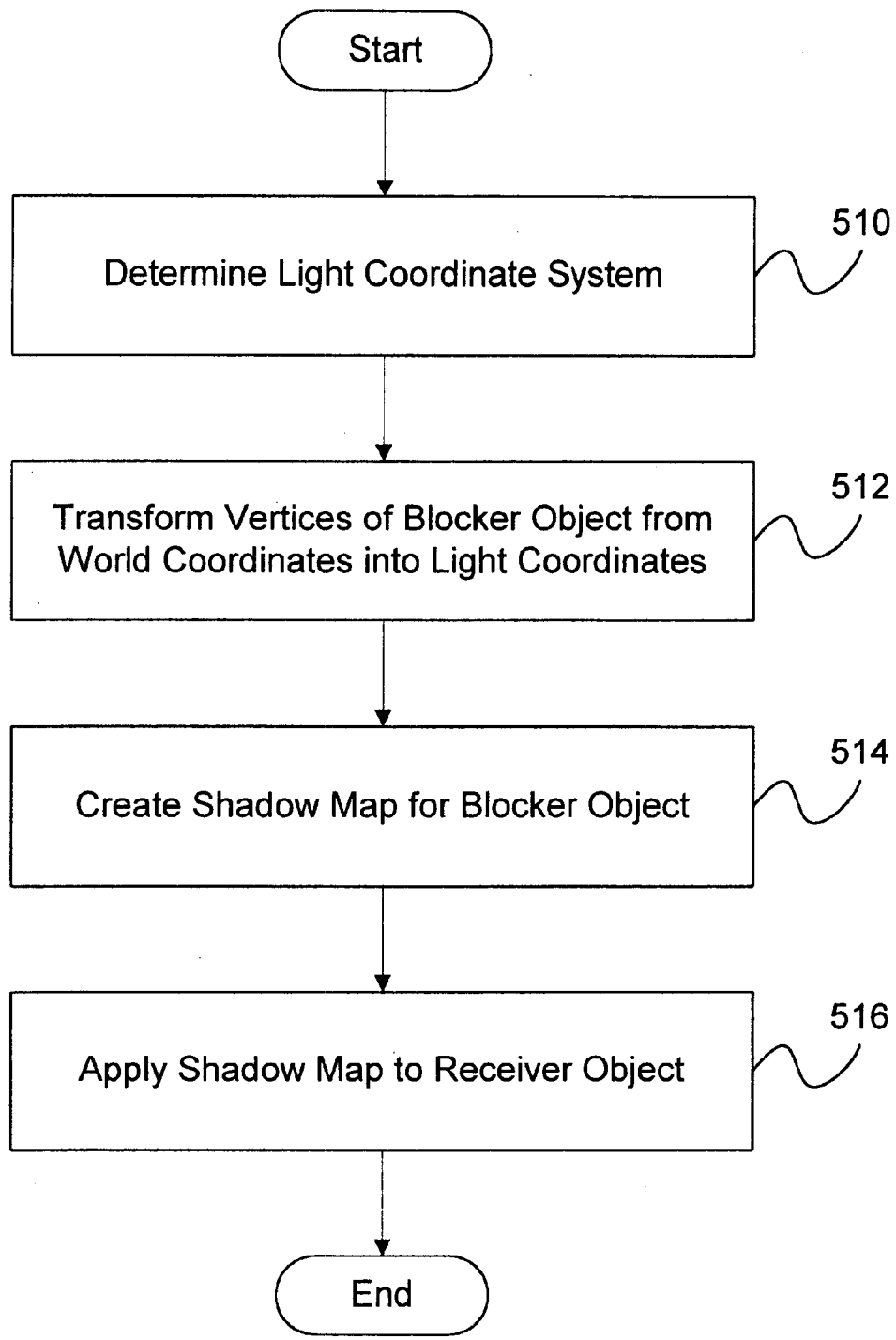
FIG. 5 is a flowchart of method steps for creating shadows of transparent objects, according to one embodiment of the invention.

FIG. 5 is a flowchart of method steps for creating shadows of transparent objects, according to one embodiment of the invention. First, in step 510, CPU 112 determines a light coordinate system. The position of a light source 430 in world coordinates is set as the origin of the light coordinate system. As described above in conjunction with FIG. 4, a unit vector from the light source pointing toward a transparent blocker object defines a z-axis of the light coordinate system.

Then, in step 512, CPU 112 transforms the vertices of the blocker object from world coordinates into light coordinates using one or more conversion matrices. In step 514, GPU 114, in conjunction with VU1 113, creates a shadow map for the blocker object. This step is further discussed below in conjunction with FIG. 6.

In step 516, VU1 113 and GPU 114 apply the shadow map to a receiver object while rendering the receiver object in an image. The shadow map is applied as a two-dimensional texture map using techniques known in the art. In the preferred embodiment, this step uses multi-pass rendering with pixel-blending. Thus multiple shadow maps may be applied to a single receiver object, and the shadows may overlap.

Figure 6:
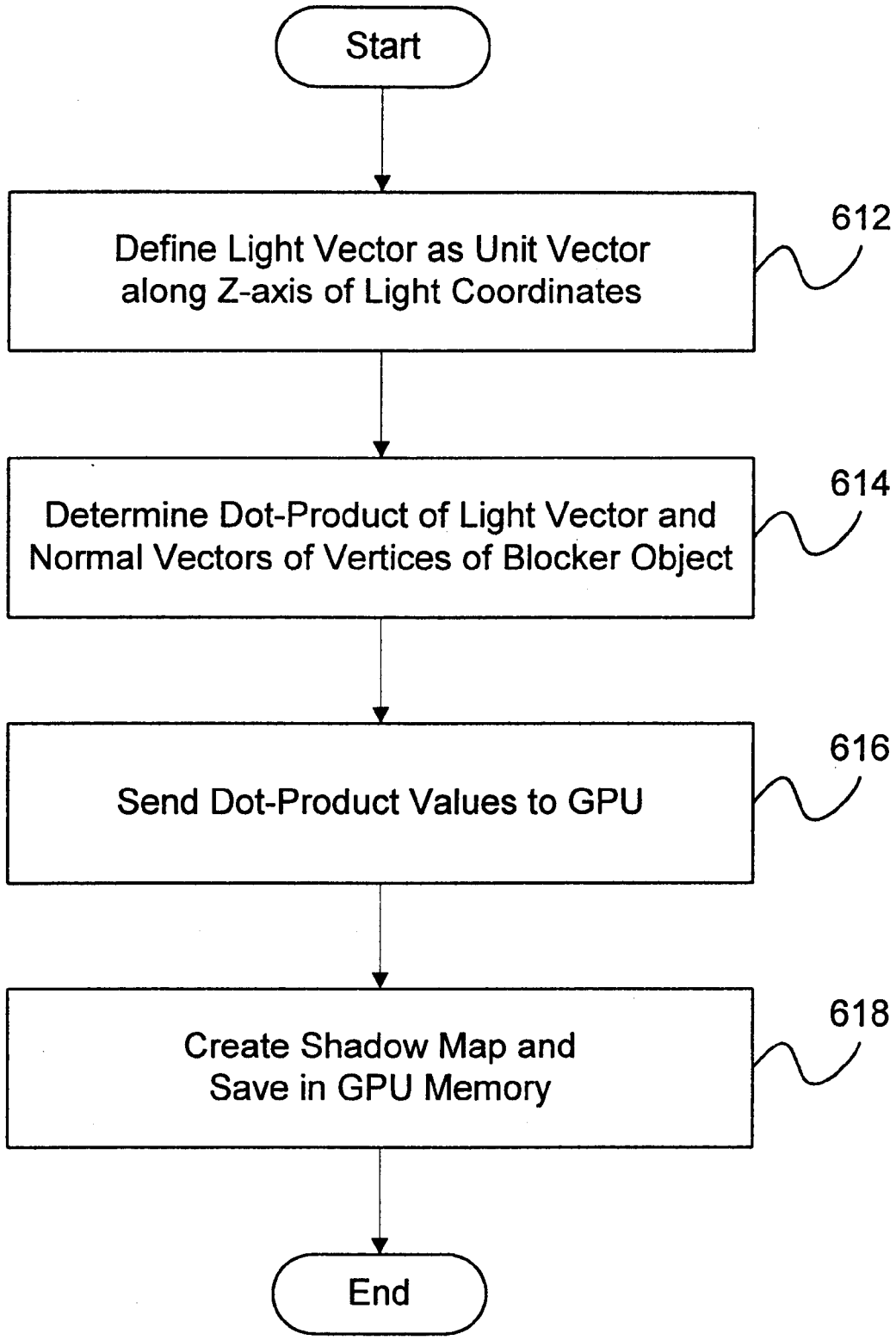
FIG. 6 is a flowchart of method steps for performing the step of creating a shadow map of FIG. 5.

FIG. 6 is a flowchart of method steps for performing the step 514 of creating a shadow map of FIG. 5. First, in step 612, CPU 112 defines a light vector as the unit vector along the z-axis of the light coordinate system. Then, in step 614, VU1 113 determines the dot-product of the light vector and all of the normal vectors of the vertices of the blocker object.

In step 616, VU1 113 sends the dot-product values for the vertices of the blocker object via bus 140 to GPU 114. Then, in step 618, GPU 114 draws the shadow map by interpolating between the vertices, and stores the shadow map in its memory 220. The dot-product values are magnitudes that are associated with the vertices of the blocker object. The values of the shadow map indicate intensity and may also indicate color so that a colored transparent blocker object casts a colored shadow on a receiver object.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An electronic entertainment system for creating a shadow of a transparent object, comprising:

a memory configured to store the transparent object and a receiver object;

a processor configured to execute game instructions and generate rendering instructions; and a graphics processor configured to calculate a shadow map for the transparent object and to apply the shadow map to the receiver object according to the rendering instructions.

2. The electronic entertainment system of claim 1, wherein the transparent object is stored in the memory as vertices that determine polygons in a world coordinate system.

3. The electronic entertainment system of claim 2, wherein the processor determines a light vector, determines a light coordinate system, and converts the vertices of the transparent object into light coordinates, and the graphics processor calculates the shadow map using dot products of the light vector and a normal vector at each vertex of the transparent object in light coordinates.

4. The electronic entertainment system of claim 3, wherein the dot products of the light vector and each vertex of the transparent object are calculated by a vector processing unit.

5. The electronic entertainment system of claim 3, wherein the processor determines a light vector by determining a mean direction vector from a light source to the transparent object.

6. The electronic entertainment system of claim 5, wherein the mean direction vector is an average of vectors from the light source to each vertex of the transparent object.

7. The electronic entertainment system of claim 5, wherein the mean direction vector is a vector from the light source to the center of a bounding volume of the transparent object.

8. The electronic entertainment system of claim 3, wherein the processor determines a light coordinate system using the light vector as a unit vector along a z-axis of the light coordinate system.

9. The electronic entertainment system of claim 3, wherein the processor uses a conversion matrix to convert the vertices of the transparent object into light coordinates.

10. The electronic entertainment system of claim 1, wherein the receiver object is stored in the memory as vertices that determine polygons in a world coordinate system.

11. The electronic entertainment system of claim 1, wherein the graphics processor applies the shadow map as a texture map to the receiver object.

12. The electronic entertainment system of claim 11, wherein the graphics processor applies the shadow map to the receiver object using multiplicative pixel-blending.

13. The electronic entertainment system of claim 1, wherein the shadow map is stored in a memory of the graphics processor.

14. A method for creating a shadow of a transparent object, comprising the steps of:

storing vertices of the transparent object in a memory;

determining a light coordinate system based on a light source and a light vector;

converting the vertices of the transparent object into light coordinates;

calculating a dot product of the light vector and a normal vector at each vertex of the transparent object in light coordinates;

storing the dot products as a shadow map; and applying the shadow map to a receiver object.

15. The method of claim 14, wherein the light vector is a mean direction vector from the light source to the transparent object.

16. The method of claim 15, wherein the mean direction vector is an average of vectors from the light source to each vertex of the transparent object.

17. The method of claim 15, wherein the mean direction vector is a vector from the light source to the center of a bounding volume of the transparent object.

18. The method of claim 14, wherein the shadow map is applied to the receiver object as a texture map.

19. The method of claim 14, wherein the shadow map is applied to the receiver object using multiplicative pixel-blending.

20. The method of claim 14, wherein the vertices of the transparent object are converted into light coordinates using a conversion matrix.

21. The method of claim 14, wherein the shadow map includes color information.

22. A computer-readable medium storing instructions for causing a computer to create a shadow of a transparent object, by performing the steps of:

storing vertices of the transparent object in a memory;

determining a light coordinate system based on a light source and a light vector;

converting the vertices of the transparent object into light coordinates;

calculating a dot product of the light vector and a normal vector at each vertex of the transparent object in light coordinates;

storing the dot products as a shadow map; and applying the shadow map to a receiver object.

23. The computer-readable medium of claim 22, wherein the light vector is a mean direction vector from the light source to the transparent object.

24. The computer-readable medium of claim 23, wherein the mean direction vector is an average of vectors from the light source to each vertex of the transparent object.

25. The computer-readable medium of claim 23, wherein the mean direction vector is a vector from the light source to the center of a bounding volume of the transparent object.

26. The computer-readable medium of claim 22, wherein the shadow map is applied to the receiver object as a texture map.

27. The computer-readable medium of claim 22, wherein the shadow map is applied to the receiver object using multiplicative pixel-blending.

28. The computer-readable medium of claim 22, wherein the vertices of the transparent object are converted into light coordinates using a conversion matrix.

29. The computer-readable medium of claim 22, wherein the shadow map contains color information.

30. A system for creating a shadow of a transparent object, comprising:

means for storing vertices of the transparent object;

means for determining a light coordinate system based on a light source and a light vector;

means for converting the vertices of the transparent object into light coordinates;

means for calculating a dot product of the light vector and a normal vector at each vertex of the transparent object in light coordinates;

means for storing the dot products as a shadow map; and means for applying the shadow map to a receiver object.

* * * * *